(12) United States Patent
Kreis et al.

(10) Patent No.: US 7,226,118 B2
(45) Date of Patent: Jun. 5, 2007

(54) WIND STOP DEVICE

(75) Inventors: Robert Kreis, Oppenweiler (DE); Peter Neumann, Oberstenfeld (DE); Joerg Riehle, Asperg (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 43 days.

(21) Appl. No.: 11/165,832

(22) Filed: Jun. 24, 2005

(65) Prior Publication Data

US 2006/0022488 A1 Feb. 2, 2006

(30) Foreign Application Priority Data

Jun. 29, 2004 (DE) .................... 10 2004 032 380
Apr. 1, 2005 (EP) .................... 05007181

(51) Int. Cl.
*B60J 7/22* (2006.01)
(52) U.S. Cl. .................. 296/180.1; 296/85; 296/180.5; 296/91
(58) Field of Classification Search .................. 296/85, 296/91, 180.1, 180.5
See application file for complete search history.

(56) References Cited

U.S. PATENT DOCUMENTS

| 5,211,718 A | 5/1993 | Götz et al. |
| 5,738,404 A | 4/1998 | Stadler et al. |
| 5,803,530 A | 9/1998 | Skrzypek et al. |
| 6,582,008 B2 | 6/2003 | Maeurle et al. |
| 6,926,062 B2 * | 8/2005 | Neumann et al. ........... 160/371 |
| 2003/0085006 A1 | 5/2003 | Neumann et al. |

FOREIGN PATENT DOCUMENTS

| DE | 44 46 764 | 6/1996 |
| DE | 195 45 405 | 6/1997 |
| DE | 100 53 701 | 5/2002 |
| DE | 101 62 758 | 7/2003 |
| EP | 0 599 811 | 6/1994 |

\* cited by examiner

*Primary Examiner*—Dennis H. Pedder
*Assistant Examiner*—Melissa A. Black
(74) *Attorney, Agent, or Firm*—Lipsitz & McAllister, LLC

(57) ABSTRACT

In order to improve a wind stop device, in particular, for convertible vehicles, comprising a wind blocker rising above a belt line of a body, and a cover connected to the wind blocker for an area, located behind the wind blocker in relation to a direction of travel, of a passenger compartment opening of the body, with respect to its optimum effect, i.e., the prevention of draft in a passenger compartment area located in front of the wind blocker, it is proposed that the wind blocker have an air permeability which is greater than an air permeability of the cover.

26 Claims, 3 Drawing Sheets

WIND STOP DEVICE

The present disclosure relates to the subject matter disclosed in German application number 10 2004 032 380.1 of Jun. 29, 2004 and European application number 05 007 181.0 of Apr. 1, 2005, which are incorporated herein by reference in their entirety and for all purposes.

BACKGROUND OF THE INVENTION

The invention relates to a wind stop device, in particular, for convertible vehicles, comprising a wind blocker rising above a belt line of a body, and a cover connected to the wind blocker for an area, located behind the wind blocker in relation to a direction of travel, of a passenger compartment opening of the body.

Such wind stop devices are known from the prior art. Herein at least the wind blocker is either not made of air-permeable material or partially made of air-permeable material.

The object underlying the invention is to improve a wind stop device of the generic kind with respect to its optimum effect, i.e., the prevention of draft in a passenger compartment area located in front of the wind blocker.

SUMMARY OF THE INVENTION

This object is accomplished in a wind stop device of the kind described at the outset, in accordance with the invention, in that the wind blocker has an air permeability which is greater than an air permeability of the, in particular air-permeable, cover.

The advantage of this solution according to the invention is to be seen in the fact that owing to the differing extent of the air permeability an optimum effect of the wind stop device is achievable, particularly in view of the fact that as low an air velocity as possible occurs in a passenger compartment area located between a windshield and the wind blocker.

It is particularly advantageous for the air permeability of the wind blocker to be at least approximately twice the air permeability of the cover.

It is even better for the air permeability of the wind blocker to be at least approximately 2.5 times the air permeability of the cover.

However, there are preferably also expedient upper limits for the air permeability of the wind blocker relative to the air permeability of the cover. It is particularly advantageous for the air permeability of the wind blocker to be less than approximately five times the air permeability of the cover.

It is even better for the air permeability of the wind blocker to be less than approximately four times the air permeability of the cover.

A particularly advantageous relation between the air permeability of the wind blocker and the air permeability of the cover prevails when the air permeability of the wind blocker is approximately three times the air permeability of the cover.

In conjunction with the embodiments described so far, reference was merely made to the relation between the air permeability of the wind blocker and the air permeability of the cover. It was, however, not indicated within which range of values this relation lies.

In one embodiment of the solution according to the invention, with an approach velocity of the air towards the cover of 10 m/s it has proven advantageous for an air current with a velocity of between approximately 0.5 m/s and approximately 2 m/s to result after the cover.

It is particularly advantageous for the extent of the air permeability of the cover to be such that with an approach velocity of the air towards the cover of 10 m/s, an air current with a velocity of between approximately 0.75 m/s and approximately 1.7 m/s results after the cover.

A particularly advantageous value for the air permeability of the cover provides that this is of such extent that with an approach velocity of the air towards the cover of 10 m/s, an air current with a velocity of between approximately 1 m/s and approximately 1.5 m/s results after the cover.

In the embodiments described so far, it was assumed that the air permeability of the cover in its entirety or of the wind blocker in its entirety is substantially homogeneous over the surface thereof.

A further advantageous embodiment does, however, provide that the cover has an air permeability which varies in a transverse direction extending transversely to the direction of travel, i.e., that the air permeability is not constant in all surface areas of the cover, but varies in the transverse direction. Such a possibility for variation of the air permeability in the transverse direction opens up further adjustment parameters for optimum adjustment of the air relations in the passenger compartment area, in particular, in order to keep the air current in the transverse direction substantially constant within the passenger compartment area.

The air permeability may vary in many different ways.

It is, however, particularly advantageous for the air permeability to vary symmetrically in relation to a longitudinal center plane extending in the direction of travel, i.e., to vary in the same way on either side of the longitudinal center plane, so substantially the same air relations are achievable for driver and front seat passenger.

A constructionally particularly simple embodiment provides that the air permeability in an inner area of the cover, which, for example, adjoins the longitudinal center plane, is different than in outer areas of the cover lying outside the inner area.

Such a variation may occur gradually or suddenly, simply by the inner area having a different air permeability per unit of surface than the outer area.

It has proven particularly advantageous for the air permeability in the inner area to be less than in the outer area of the cover.

Furthermore, the air permeability in the area of the wind blocker may also be expediently varied in the transverse direction.

An advantageous solution provides that the wind blocker has an air permeability which varies in a transverse direction extending transversely to the direction of travel, so that by varying the air permeability, an optimum adjustment to the flow conditions of the body is also achievable in the wind blocker, which projects above the belt line of the body transversely to the cover.

In this regard, it is also particularly advantageous for the air permeability to vary symmetrically in relation to a longitudinal center plane extending in the direction of travel.

Furthermore, the air permeability may also be adapted in a simple way in the area of the wind blocker by being different in an inner area of the wind blocker, which, for example, adjoins the longitudinal center plane, than in an outer area of the wind blocker lying outside of the inner area.

Such a variation may be brought about in a particularly simple way when the air permeability in the inner area is greater than in the outer area of the wind blocker.

So far, no details of the construction of the wind blocker itself have been given.

The wind blocker could, for example, be made from a plate-shaped, in particular inherently stiff, air-permeable material.

Such a wind blocker may be designed as a frameless wind blocker.

A particularly advantageous solution provides that the wind blocker is formed by a wind blocker frame and a wind blocker frame insert.

In this case, the wind blocker frame insert is preferably air-permeable and brings about the above-specified air permeability of the wind blocker.

The wind blocker frame insert could also be, for example, an inherently stiff flat material or a grid material.

A particularly expedient solution provides that the wind blocker frame insert is made from a flat material having a slackness that allows it to be bent.

The flat material having a slackness that allows it to be bent is expediently clamped into the wind blocker frame and thereby held in the desired form by the wind blocker frame.

The cover may also be of frameless design, for example, due to an inherently stiff air-permeable material.

Furthermore, it is also advantageous for the cover to be formed by at least one cover frame and one cover frame insert.

In this case, the cover frame insert also brings about the desired air permeability.

The cover frame insert could also be made, for example, from an inherently stiff, air-permeable flat material or grid.

It is particularly expedient for the cover frame insert to be made from a flat material having a slackness that allows it to be bent.

In this case, it is advantageous for the flat material having a slackness that allows it to be bent to be clamped into the cover frame.

Regarding the design of the wind blocker itself, no further details have so far been given. An advantageous embodiment provides that the wind blocker is formed by two wind blocker parts, which, in turn, are adapted to be brought by pivoting about a pivot axis from an extended position in which the wind blocker extends with a maximum extent in a direction of extension into a folded position in which the two wind blocker parts lie substantially on top of each other, and that the cover is formed by two cover parts.

Further features and advantages of the invention are the subject matter of the following description and the drawings of several embodiments.

DETAILED DESCRIPTION OF THE INVENTION

Figure 1:
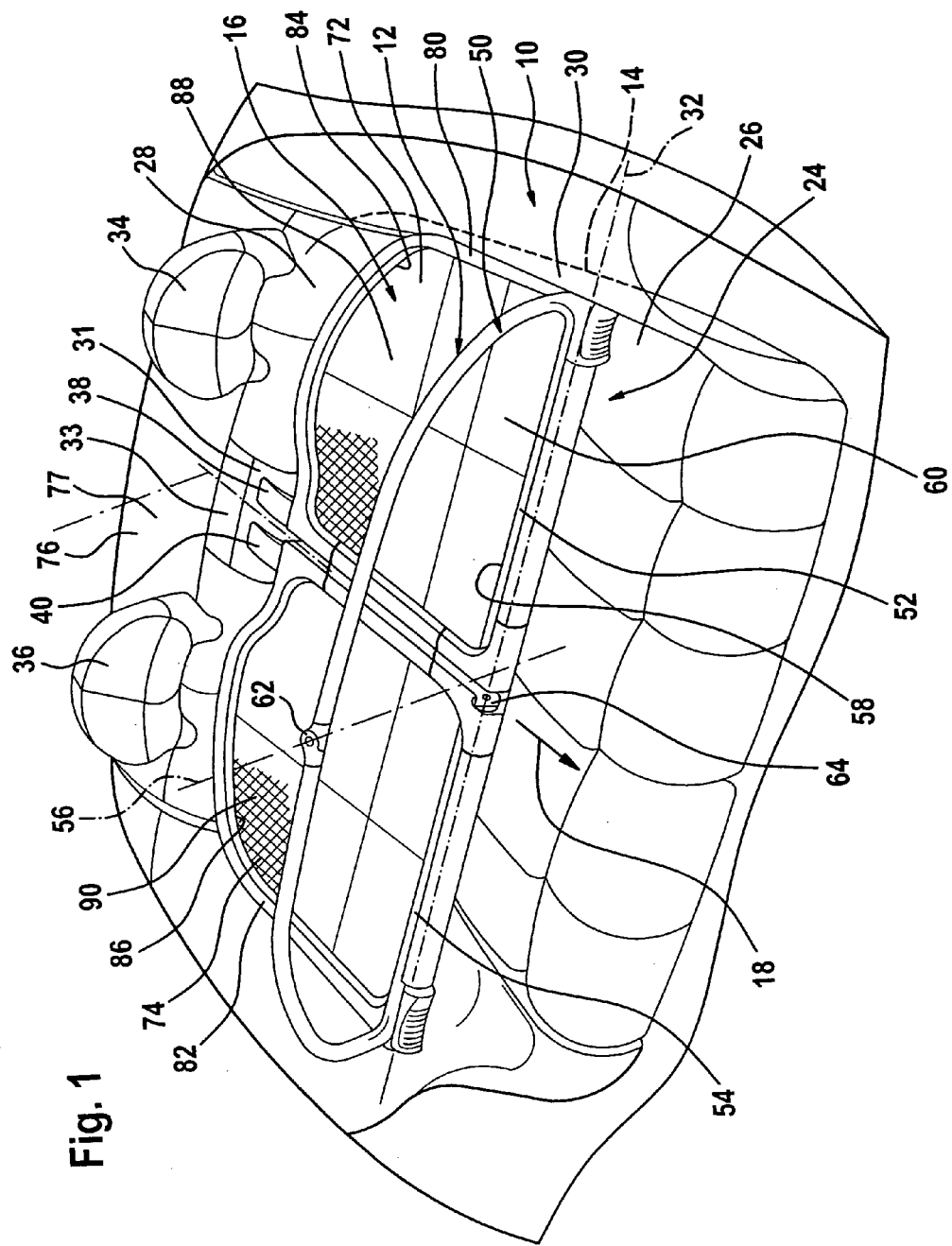
FIG. 1 a perspective illustration of a first embodiment of a wind stop device mounted on a body of a convertible vehicle with a view from a front side of the body in the direction of a rear side.

A first embodiment of a wind stop device according to the invention for a motor vehicle, in particular, a convertible vehicle, the body 10 of which is represented in a partial illustration in FIG. 1, comprises a wind blocker 12, which projects upwards beyond a belt line 14 of the body 10 of the motor vehicle, and a cover 16, which relative to a direction of travel 18 covers an area 20, located behind the wind blocker 12, of a passenger compartment opening 22 arranged approximately at the level of the belt line 14. The area 20 of the passenger compartment opening 22 is, for example, located above a rear seat arrangement 24 comprising a bench seat 26 and a rear seat back 28.

The area 20 of the passenger compartment opening 22 preferably adjoins the rear seat back 28 directly, extends as far as the wind blocker 12 in the direction of travel 18 and also adjoins side walls 30 of the body in the region of the belt line 14.

The wind blocker 12 is expediently placed so as to be essentially arranged directly behind headrests, not shown in the drawing of FIG. 1, of front seats of the motor vehicle.

The cover 16 is preferably articulatedly connected to the wind blocker 12, for example, so as to be pivotable about a fold axis 32, and both are jointly fixable in the region of the belt line 14 on the body 10, for example, in the region of the side walls 30 of the body, by means of fixing devices, not shown individually in the drawings, which are arranged on either the wind blocker 12 or the cover 16.

In addition, a fixing device 31 for the cover 16 is advantageously provided in the region of the rear seat arrangement 24, for example, in a central region 33 of the rear seat back 28, between headrests 34, 36, and the fixing is effected, for example, by means of projections 38, 40 protruding from the cover 16.

The wind blocker 12 is formed by a wind blocker frame 50 comprising two frame parts 52 and 54, which are pivotable relative to each other about a pivot axis 56 representing, for example, a center axis of the wind blocker frame 50, and are thus brought from a folded-out operative position in which the wind blocker frame 50 extends with its maximum extent transversely to the direction of travel 18 in the direction of its frame surface into a folded position in which the frame parts 52, 54 lie approximately on each other.

The two frame parts 52 and 54 jointly enclose a frame opening 58 which is closed by a wind blocker frame insert 60. When the frame parts 52, 54 are folded out and are thus in the operative position, the wind blocker frame insert 60 engages over the frame opening 58 of the wind blocker frame 50.

The wind blocker frame insert 60 is air-permeable, but is designed so as to block a rapid air current.

The frame parts 52, 54 are preferably designed so as to be connected to each other by hinges 62, 64 and so as to each extend in the shape of a C on either side of the pivot axis 56, so that in the operative position the frame opening 58 as a whole is enclosed by the C-shaped frame parts 52, 54 and, in particular, is therefore not divided by stays in the region of the pivot axis 56.

The cover 16 is also formed by two cover parts 72, 74, which are separated from each other in the area of a dividing plane 76 in which the pivot axis 56 is also located.

The dividing plane 76 preferably coincides with a longitudinal center plane 77 of the body 10 and thus also represents a plane of symmetry of the wind stop device.

Furthermore, the two cover parts 72 and 74 or only one of these is or are articulatedly connected to the wind blocker 12, for example, pivotably about the fold axis 32, so as to be able to fold the entire wind stop device together.

In a variant of the wind stop device according to the invention, folding is effected in accordance with DE 195 45 405, to the contents of which reference is made in full in this connection. In this type of folding, the two cover parts 72 and 74 are articulatedly connected to the wind blocker 12, each with one of the two frame parts 52, 54, so that when folding these a pivoting about the pivot axis 56 and a folding together of the frame parts 52 and 54 and of the cover parts 72 and 74 takes place in such a way that the frame parts 52, 54 lie on each other and between the cover parts 72, 74.

Another solution for the folding together is described in DE 100 53 701 A1, to which reference is also made in full in this connection. In this solution, the cover parts 72 and 74 are articulatedly connected to each other, but only one of the cover parts 72 or 74 is permanently articulatedly connected to one of the frame parts 52 or 54, so that the cover parts 72 and 74 and the frame parts 52 and 54 can be respectively folded together relative to one another, and then as a whole the folded together frame parts 52, 54 and the folded together cover parts 72, 74 can be placed on one another between one of the cover parts 72, 74 and one of the frame parts 52, 54 by pivoting about the fold axis 32.

As shown in FIG. 1, each of the cover parts 72 and 74 comprises a cover frame 80, 82 which is fixable in the described manner on the body 10.

Each cover frame 80, 82 encloses an opening 84, 86 which is closed by a cover frame insert 88, 90.

Figure 2:
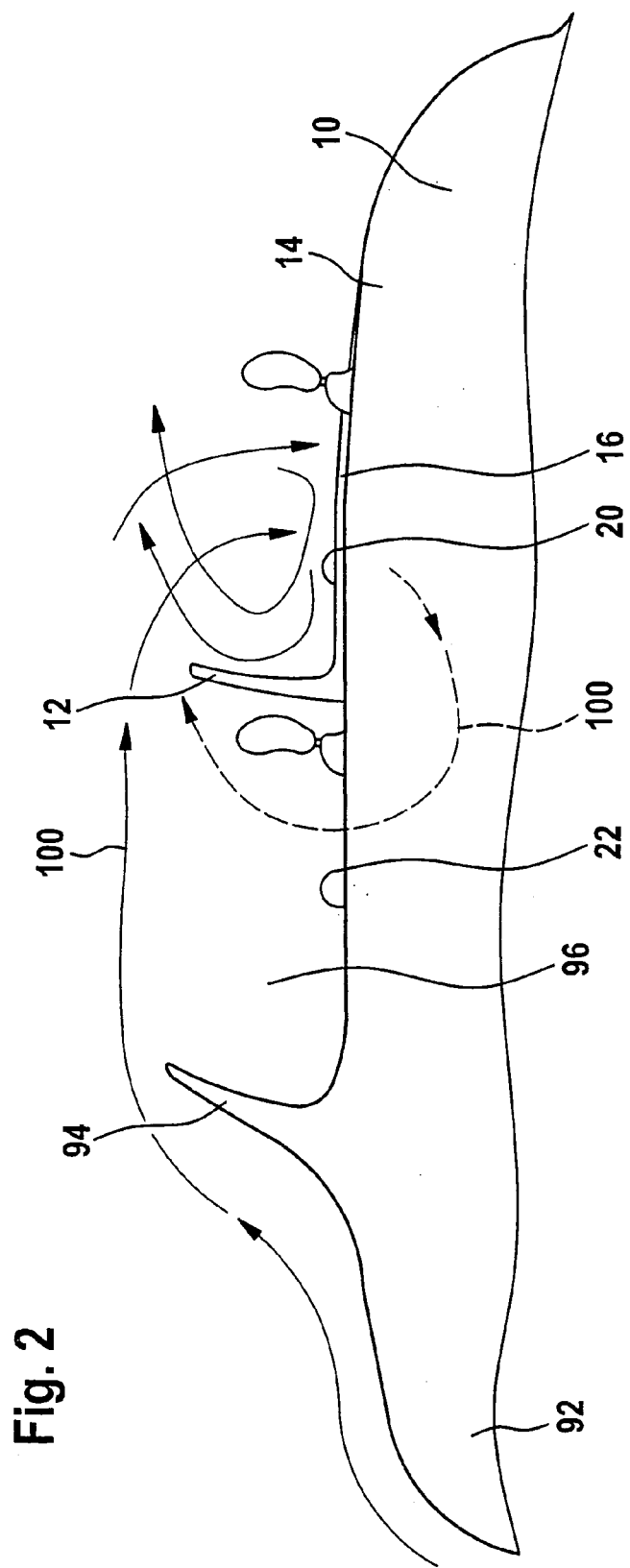
FIG. 2 a side view of the body with the wind stop device shown in FIG. 1.

As shown in FIG. 2, in a convertible vehicle the air current 100 rising from a front side 92 and a windshield 94 over a front passenger compartment area 96 located behind the windshield 94 has the tendency to flow past the front passenger compartment area 96 and the wind blocker 12 but to drop in the direction of the body 10 after the wind blocker 12. In the case of a cover 16 permeable to the air current 100, this would result in the air current 100 penetrating the cover 16, flowing from the rear seat arrangement 24 in the direction of the passenger compartment area 96 and then flowing out of and away from it again via the wind blocker 12, so that the above-mentioned draft phenomena would occur in the passenger compartment area 96.

On the other hand, a closure of the frame opening 58 and of the openings 84, 86 of the cover frames 80, 82, which is completely impermeable to air, would result in a low pressure occurring on account of the air current 100 in the passenger compartment area 96 between the windshield and the wind blocker 12, which, in turn, would cause air to enter from the environment into the passenger compartment 96, in particular, in the side area between the windshield 94 and the wind blocker 12, so that the undesired draft phenomena owing to air currents would also occur at least in outer side areas of the passenger compartment 96.

For this reason both the wind blocker frame insert 60 and the cover frame inserts 88, 90 are made from a partially air-permeable material, more particularly, such that the air permeability of the wind blocker frame insert 60 is greater than the air permeability of the cover frame inserts 88, 90.

The cover frame inserts 88, 90 preferably have an air permeability which is greater than zero so as to avoid formation of a low pressure in the passenger compartment 96, and the wind blocker frame insert 60 has an air permeability which is at least twice the air permeability of the cover frame inserts 88, 90.

Thus, on the one hand, air currents are substantially suppressed in the passenger compartment 96 between the windshield 94 and the wind blocker 12, and, on the other hand, the above-described formation of a low pressure in the passenger compartment 96 is avoided.

It is particularly advantageous for the air permeability of the wind blocker frame insert 60 to be at least twice the air permeability of the cover frame insert 88, 90.

The air permeability of the wind blocker frame insert 60 is advantageously at maximum five times the air permeability of the cover frame insert 88, 90.

A particularly advantageous relation is achievable when the air permeability of the wind blocker frame insert 60 is approximately three times the air permeability of the cover frame insert 88, 90.

An air permeability of between approximately 1 and approximately 1.5 m/s at an approach velocity of 10 m/s and of between approximately 1.5 m/s and approximately 2 m/s at an approach velocity of 15 m/s is advantageous for the air permeability of the cover frame insert 88, 90.

The degree of shading of such a cover frame insert with the above-mentioned air permeability lies between approximately 90 and 96%.

Both the wind blocker frame insert 60 and the cover frame inserts 88, 90 are preferably made of flat materials which have a slackness that allows them to be bent and which are clamped in the wind blocker frame 50 and in the cover frames 80, 82.

In the solution according to the invention, the air permeability of the wind blocker frame insert 60 is to be understood as the average value over the entire wind blocker frame insert 60, and the air permeability of the cover frame inserts 88, 90 as the average value over the entire cover frame inserts 88, 90.

Figure 3:
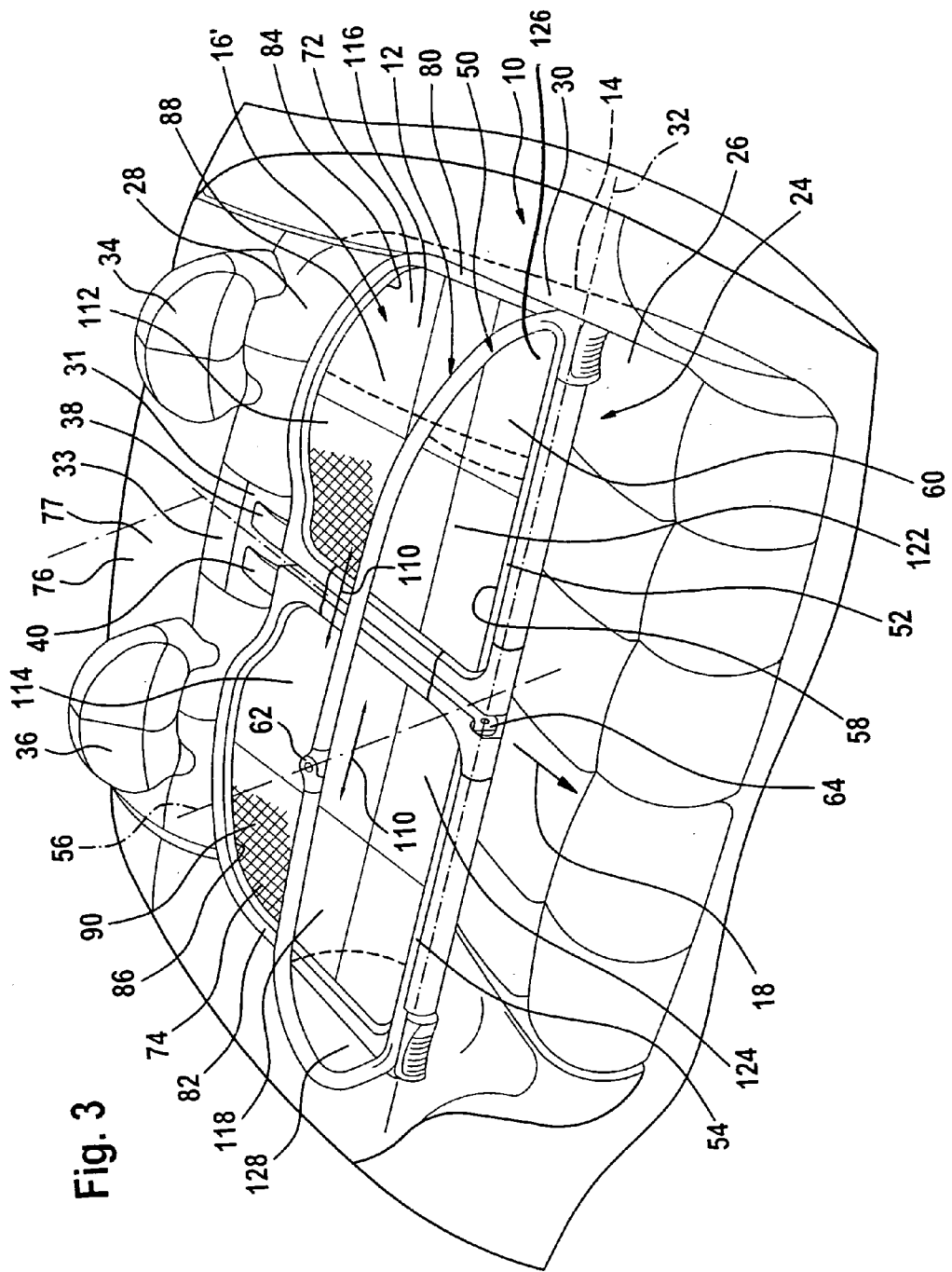
FIG. 3 a perspective illustration similar to FIG. 1 of a second embodiment of a wind stop device.

In a second embodiment of a wind stop device according to the invention, shown in FIG. 3, the cover 16' is designed with a varying air permeability per unit of surface in a transverse direction 110 extending transversely, preferably perpendicularly, to the longitudinal center plane 77 or to the dividing plane 76, i. e., the air permeability of the cover frame inserts 88 and 90 varies in the transverse direction 110.

For example, in inner areas 112 and 114 of the cover frame inserts 88 and 90 lying directly on either side of the dividing plane 76 or the longitudinal center plane 77 the air permeability is less than in outer areas 116, 118 of the cover frame inserts adjoining these inner areas 112, 114 on a side located opposite the dividing plane 76 or the longitudinal center plane 77.

By way of such an air permeability varying in the transverse direction, the conditions in the passenger compartment 96 can also be adapted in a particularly advantageous way in the transverse direction 110 so as to avoid unpleasant draft phenomena in the passenger compartment 96 in front of the wind blocker 12.

Furthermore, it is also possible to provide the wind blocker frame insert 60 with a varying air permeability in the transverse direction 110, for example, by a higher air permeability prevailing in inner areas 122 and 124 immediately adjoining the pivot axis 56 than in outer areas 126, 128 of the wind blocker frame insert 60 adjoining the inner areas 122, 124 on a side located opposite the pivot axis 56, thereby providing an additional possibility for adaptation.

In the second embodiment, shown in FIG. 3, the air permeability thus varies, for example, suddenly in the transition from the respective inner area 112, 114 and 122, 124 to the respective outer area 116, 118 and 126, 128.

It is, however, also conceivable for the air permeability to vary gradually in the transverse direction 110.

In this case the air permeability is not to be seen as the air permeability in relation to the entire cover frame inserts 88, 90 and the wind blocker frame insert 60, respectively, but, in this case, in relation to a unit of surface in the respective inner areas 112, 114 and 122, 124, respectively, or in the outer areas 116, 118 and 126, 128, respectively.

Such a variation in the air permeability may be achieved in many different ways.

It is, for example, conceivable to achieve different air permeability by way of different design of the knitted or woven fabric.

It is, however, also conceivable to place an additional piece of material on the respective area, in order to thereby reduce the air permeability in this area.

Further possibilities consist in applying additional material to a continuous knitted or woven fabric, for example, by imprinting a material which reduces the air permeability or by adhesively bonding or sewing on additional materials which reduce the air permeability.

A further alternative for bringing about a varying air permeability in the transverse direction resides in sewing together different materials.

The invention claimed is:

1. Wind stop device for convertible vehicles, comprising: a wind blocker rising above a belt line of a body; and a cover connected to the wind blocker for an area, located behind the wind blocker in relation to a direction of travel, of a passenger compartment opening of the body, the wind blocker having an air permeability which is greater than an air permeability of the cover.

2. Wind stop device in accordance with claim 1, wherein the air permeability of the wind blocker is approximately twice the air permeability of the cover.

3. Wind stop device in accordance with claim 2, wherein the air permeability of the wind blocker is at least approximately 2.5 times the air permeability of the cover.

4. Wind stop device in accordance with claim 1, wherein the air permeability of the wind blocker is at maximum approximately five times the air permeability of the cover.

5. Wind stop device in accordance with claim 4, wherein the air permeability of the wind blocker is at maximum approximately four times the air permeability of the cover.

6. Wind stop device in accordance with claim 1, wherein the air permeability of the wind blocker is approximately three times the air permeability of the cover.

7. Wind stop device in accordance with claim 1, wherein the air permeability of the cover is of such size that at an approach velocity of the air of 10 m/s towards the cover an air current with a velocity of between approximately 0.5 m/s and approximately 2 m/s results after the cover.

8. Wind stop device in accordance with claim 7, wherein the air permeability of the cover is of such size that at an approach velocity of the air of 10 m/s towards the cover an air current with a velocity of between approximately 0.75 m/s and approximately 1.7 m/s results after the cover.

9. Wind stop device in accordance with claim 8, wherein the air permeability of the cover is of such size that at an approach velocity of the air of 10 m/s towards the cover an air current with a velocity of between approximately 1 m/s and approximately 1.5 m/s results after the cover.

10. Wind stop device in accordance with claim 1, wherein the cover has an air permeability which varies in a transverse direction extending transversely to the direction of travel.

11. Wind stop device in accordance with claim 10, wherein the air permeability varies symmetrically in relation to a longitudinal center plane extending in the direction of travel.

12. Wind stop device in accordance with claim 1, wherein the air permeability in an inner area of the cover is different than in an outer area of the cover that lies outside of the inner area.

13. Wind stop device in accordance with claim 12, wherein the air permeability in the inner area is lower than in the outer area of the cover.

14. Wind stop device in accordance with claim 1, wherein the wind blocker has an air permeability which varies in a transverse direction extending transversely to the direction of travel.

15. Wind stop device in accordance with claim 14, wherein the air permeability varies symmetrically in relation to a longitudinal center plane extending in the direction of travel.

16. Wind stop device in accordance with claim 1, wherein the air permeability in an inner area of the wind blocker is different than in an outer area of the wind blocker that lies outside of the inner area.

17. Wind stop device in accordance with claim 16, wherein the air permeability in the inner area is greater than in the outer area of the wind blocker.

18. Wind stop device in accordance with claim 1, wherein the wind blocker is formed by a wind blocker frame and a wind blocker frame insert.

19. Wind stop device in accordance with claim 18, wherein the wind blocker frame insert is of air-permeable design.

20. Wind stop device in accordance with claim 19, wherein the wind blocker frame insert is formed from a flat material having a slackness that allows it to be bent.

21. Wind stop device in accordance with claim 20, wherein the flat material having a slackness that allows it to be bent is clamped in the wind blocker frame.

22. Wind stop device in accordance with claim 1, wherein the cover is formed by at least one cover frame and a cover frame insert.

23. Wind stop device in accordance with claim 22, wherein the cover frame insert is of air-permeable design.

24. Wind stop device in accordance with claim 23, wherein the cover frame insert is formed from a flat material having a slackness that allows it to be bent.

25. Wind stop device in accordance with claim 24, wherein the flat material having a slackness that allows it to be bent is clamped in the cover frame.

26. Wind stop device in accordance with claim 1, wherein:
the wind blocker is formed by two wind blocker parts which, in turn, are adapted to be brought by pivoting about a pivot axis from a extended position in which the wind blocker extends with a maximum extent in a direction of extension into a folded position in which the two wind blocker parts lie substantially on top of each other; and
in that the cover is formed by two cover parts.

* * * * *